United States Patent [19]

Hobo et al.

[11] 4,019,478
[45] Apr. 26, 1977

[54] FUEL INJECTION TIMING CONTROL SYSTEM FOR INTERNAL COMBUSTION ENGINE

[75] Inventors: Nobuhito Hobo, Inuyama; Nizo Enomoto, Chita; Yutaka Suzuki, Nishio; Itsushi Kawamoto, Kariya; Michio Iyoda, Aichi; Yoshihiko Tsuzuki, Kariya; Kenro Sekino; Hironari Nukata, both of Toyota, all of Japan

[73] Assignees: Nippondenso Co., Ltd., Kariya; Toyota Jidosha Kogyo Kabushiki Kaisha, Toyota, both of Japan

[22] Filed: Sept. 12, 1975

[21] Appl. No.: 613,017

Related U.S. Application Data

[63] Continuation of Ser. No. 381,385, July 23, 1973, abandoned.

[52] U.S. Cl. .................. 123/139 AP; 123/139 E
[51] Int. Cl.² ................................. F02M 3/00
[58] Field of Search ......... 123/139 E, 117 R, 32 A, 123/32 C, 139 AP, 139 AQ

[56] References Cited

UNITED STATES PATENTS 3,587,535  6/1971  Kimberly .................. 123/139
3,796,197  3/1974  Locher .................... 123/139 E Primary Examiner—Ronald B. Cox
Attorney, Agent, or Firm—Cushman, Darby & Cushman

[57] ABSTRACT

A fuel injection timing control system is provided wherein a fluid actuator having a fluid chamber containing therein a movable wall member and the amount of pressure medium in the fluid chamber are controlled by electromagnetically operated control valve means to cause the actuator to operate an element for controlling the fuel injection timing of a fuel injection pump. In the control system of this invention, a control voltage is produced from at least a speed signal corresponding to the rotational speed of an engine and a fuel injection quantity signal corresponding to the amount of fuel injected into the engine from a fuel injection pump, and this control voltage is compared with a injection timing voltage corresponding to the fuel injection timing of the fuel injection pump to produce a deviation signal which is used to actuate the electromagnetically operated control valve means so as to automatically control the fuel injection timing of the injection pump and thereby to obtain the optimum injection timing that suits the varying operating conditions of the engine.

3 Claims, 8 Drawing Figures

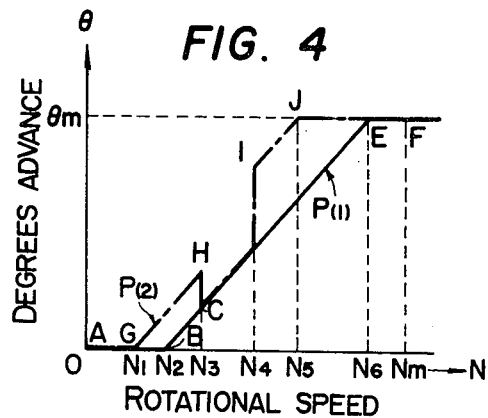

FUEL INJECTION TIMING CONTROL SYSTEM FOR INTERNAL COMBUSTION ENGINE

This is a continuation of application Ser. No. 381,385, filed July 23, 1973, now abandoned.

BACKGROUND OF THE INVENTION

1. Field of the Invention

The present invention relates to an internal combustion engine fuel injection timing control system which is designed to control the fuel injection timing of an injection pump employed in a fuel injection system of the type incorporated in an internal combustion engine, particularly a Diesel engine, in accordance with electrically detected operating parameter signals.

2. Description of the Prior Art

In the past, as a means for controlling the fuel injection timing of an injection pump, such as an in-line injection pump used in a Diesel engine, a mechanical injection advance system known as the "automatic timer" has been employed.

This system is so designed that the driving shaft of an injection pump is advanced by the centrifugal force generated by the weights which rotate along with the driving shaft of the injection pump. Therefore, while this system is capable of performing a simple injection timing control of such a kind as advancing the injection timing in proportion to the rotational speed of the engine, it is essential for the purpose of engine exhaust emission control and noise suppression that not only the rotational speed of an engine, but also other operating parameters, in particular the amount of fuel injected into the engine from an injection pump be reflected properly in the fuel injection timing.

There is thus a problem that the fuel injection timing control characteristic which meets these requirements cannot readily be provided by the conventional mechanical injection advance systems utilizing only the centrifugal force.

SUMMARY OF THE INVENTION

It is therefore an object of the present invention to provide an improved furl injection timing control system which overcomes the foregoing difficulty. In one form of the improved system according to the present invention in which a fluid actuator having a fluid chamber containing a movable wall member therein and the amount of pressure medium in the fluid chamber are controlled by electromagnetic control valve means so as to cause the actuator to actuate the fuel injection timing control element of a fuel injection pump, as the operating parameters of an engine for determining a predetermined fuel injection timing control characteristic of the engine, at least a speed signal corresponding to the rotational speed of the engine and an injection quantity signal corresponding to the amount of fuel injected into the engine from the injection pump are generated. These two operating parameter signals are applied as inputs to a control voltage generator which generates a control voltage corresponding to the predetermined fuel injection timing control characteristic of the engine, while an injection timing signal corresponding to the fuel injection timing of the injection pump is generated by an injection timing voltage generator, whereby the control voltage is compared with the injection timing voltage in a comparator which generates a deviation signal corresponding to the fifference between the voltages. This deviation signal is then applied as an input signal to a valve driving circuit to generate a valve actuating voltage which is used to actuate the electromagnetic control valve means to thereby automatically control the injection timing of the injection pump according to the predetermined fuel injection timing control characteristic.

According to the present invention, the fuel injection timing is determined in response to at least two operating parameters of an engine, i.e., the rotational speed of the engine and the amount of fuel delivered to the engine and there is thus a remarkable advantage in that a predetermined fuel injection timing control characteristic can be determined by collectively taking various conditions such the output characteristic, noise and exhaust gases of an engine into consideration, thereby ensuring an improved engine performance under varying operating conditions of the engine and also automatically controlling the injection timing of the injection pump.

In accordance with the present invention, there is thus provided a fuel injection timing control system for an internal combustion engine comprising a fuel injection timing control element provided in a fuel injection pump, operating parameter detecting means for detecting the operating parameters of an engine in the form of electric signals, said detecting means including at least a speed signal generator for detecting the rotational speed of the engine and an injection quantity signal generator for detecting the amount of fuel injected from said injection pump, a control voltage generator for receiving the signals generated from said operating parameter detecting means to generate a control voltage corresponding to a predetermined fuel injection timing control characteristic of the engine, an injection timing voltage generator for generating a voltage corresponding to the injection timing of said injectin pump, a comparator for comparing said control voltage with said injection timing voltage to generate a deviation signal corresponding to the difference between said voltages, and a driving circuit responsive to said deviation signal to generate an actuating voltage for actuating said fuel injection timing control element.

BRIEF DESCRIPTION OF THE DRAWING

FIG. 4 is a rotational speed versus degree of advance characteristic diagram showing an example of the predetermined fuel injection timing control characteristic of a Diesel engine.

FIG. 5 is a rotational speed versus speed voltage characteristic diagram of the speed signal generator used with the present invention.

FIG. 7 is a speed voltage versus control voltage characteristic diagram of the control voltage generating circuit used with the present invention.

FIG. 8 is a degree of advance versus injection timing voltage characteristic diagram of the injection timing voltage generator used with the present invention.

DESCRIPTION OF THE PREFERRED EMBODIMENT

Figure 1:
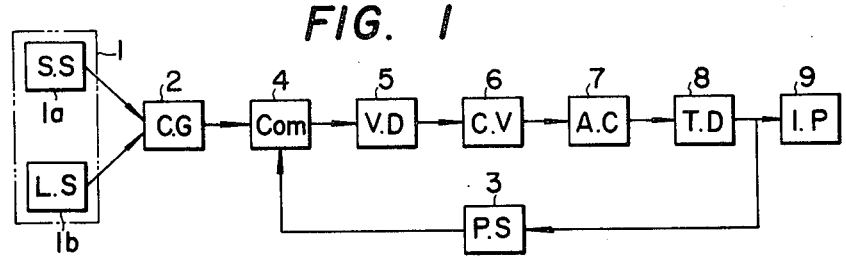
FIG. 1 is a block diagram showing an embodiment of a fuel injection timing control system according to the present invention.

The present invention will now be explained in greater detail with reference to the accompanying drawings. Referring first to FIG. 1 showing the construction of the injection timing control system according to the present invention, numeral 1 designates operating parameter detecting means comprising at least a rotational speed signal generator 1a for generating a speed signal corresponding to the rotational speed of an engine and an injection quantity signal generator 1b for generating an injection quantity signal corresponding to the amount of fuel injected into the engine from an injection pump. Numeral 2 designates a control voltage generator for receiving as its input signals the operating parameter signals generated from the operating parameter detecting means 1 to generate a control voltage corresponding to the predetermined fuel injection timing control characteristic of the engine, and more particularly this control voltage generator performs the equivalent function as a function generator which receive the operating parameter signals as its input signals and uses the predetermined injection timing control characteristic as a function pattern. Numeral 3 designates an injection timing voltage generator for generating an injection timing voltage corresponding to the fuel injection timing of the injection pump. Numeral 4 designates a comparator for comparing the control voltage with the injection timing voltage to produce a deviation signal corresponding to the difference between the two voltages. Numeral 5 designates an electromagnetic valve driving circuit responsive to the deviation signal from the comparator 4 to generate a valve actuating voltage for actuating electromagnetic control valve means 6.

This electromagnetic control valve means 6 controls the amount of working flud in the fluid chamber of a flud actuator 7 in accordance with the valve actuating voltage supplied from the valve driving circuit 5.

Figure 2:
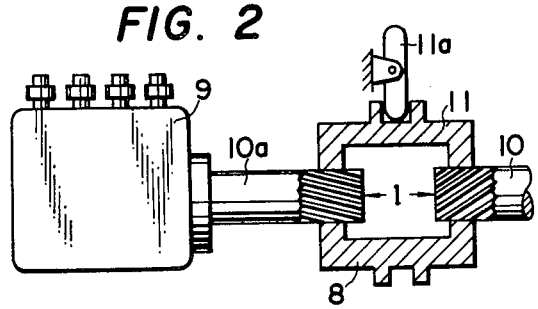
FIG. 2 is a partial sectional view showing an embodiment of the injection timing control unit used with the present invention.

The flud actuator 7 is so designed that the position of its movable wall member is determined in accordance with the amount of fluid in the fluid chamber and the injection timing control element in an injection timing control unit 8 of the injection pump is actuated in accordance with changes in the position of the movable wal member. The injection timing control unit 8 is designed to change the phase angle between the engine side driving shaft operatively connected to the engine crankshaft and the pump side driving shaft on the injection pump side, and it is equivalent to a previously known manually operated injection timing control device for in-line injection pumps, which is termed as the "hand timer." The principal structure of this injection timing control unit 8 is shown in FIG. 2, and its engine side driving shaft 10 operatively connected to the crankshaft of the engine and a pump side driving shaft 10 a on the side of an injection pump 9 are formed with helical grooves cut in the opposite direction with respect to each other and a connecting cylinder 11 for connecting these shafts together is disposed therebetween in mesh with the herical grooves of the shafts. With this construction, the distance between the engine side driving shaft 10 and the pump side driving shaft 10a is maintained at a predetermined value $l$ so that the phase angle of the pump side driving shaft 10a with respect to the engine side driving shaft 10 can be adjusted by moving the connecting cylinder 11 back and forth with a lever 11a. This connecting cylinder 11a can be properly termed as the "injection timing control element."

Figure 3:
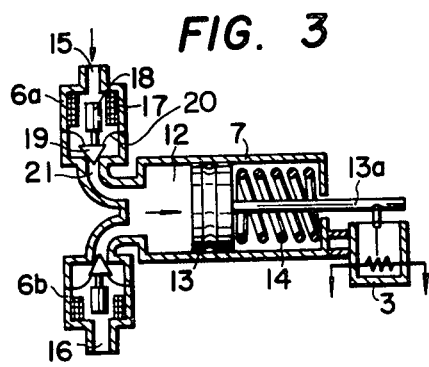
FIG. 3 is a sectional view showing an embodiment of the principal structure of the fluid servomotor used with the present invention.

The electromagnetic control valve means 6 and the fluid actuator 7 also constitute a fluid servomotor which will be explained with reference to FIG. 3 illustrating an embodiment thereof. In this embodiment, the fluid servomotor comprises two on-off type electromagnetic control valves 6a and 6b which constitute respectively an inlet side electromagnetic control valve and outlet side electromagnetic control valve, and numeral 7 designates the fluid actuator.

The construction and operation of the inlet and outlet side electromagnetic control valves 6a and 6b will be explained first referring, by way of example, to the inlet side electromagnetic control valve 6a in which numeral 20 designates a spring, whereby when there is no exciting current flow in an exciting coil 17, the valve body 19 is caused to rest on the valve seat closing a fluid passage 15 and providing a closed valve condition. On the other hand, when an exciting current flows in the exciting coil 17 so that a movable iron core 18 is moved by the electromagnetic attraction produced by the coil 17, the valve body 19 is separated from the valve seat opening the fluid passage 15 and providing an open valve condition. The construction and operation just described are the same with the reversely arranged outlet side electromagnetic control valve 6b.

The fluid actuator 7 is further provided with a movable wall member 13 within its fluid chamber 12, so that in addition to the force of the hydraulic pressure within the fluid chamber 12 which acts on the movable wall member 13, the force of a counteracting spring 14 is applied to the movable wall member 13 in a direction that counteracts the former force. The amount of fluid in the fluid chamber 12 is determined by the electromagnetic control valve 6a which opens and closes the passage 15 leading to a high pressure side fluid source and the electromagnetic control valve 6b which opens and closes a passage 16 leading to a low pressure side fluid source. When both of the electromagnetic control valves 6a and 6b are in the closed position, if the leakage of fluid at the sealed portions is neglected, there is no fluid flow into and out of the fluid chamber 12 and consequently the amount of fluid in the fluid chamber 12 is maintained at a predetermined valve, thus placing the movable wall member 13 at a predetermined position corresponding thereto. A connecting rod 13a connected to the movable wall member 13 is also connected to the lever 11a which operates the connecting cylinder 11 or the injection timing control element for the injection pump 9. In the fluid servomotor constructed as described so far, when only the inlet side electroagnetic control voltage 6a is in the open position, a fluid flows from the high pressure fluid source into the fluid chamber 12 through the passage 15, thus moving the movable wall member 13 in the direction of the arrow. On the other hand, when only the outlet side electromagnetic control valve 6b is in the open position, the passage connecting the fluid chamber 12 with the low pressure fluid source is opened so that the fluid in the fluid chamber 12 is forced out of the chamber toward the low pressure fluid source by the force of the counteracting spring 14 acting on the movable wall member 13, thereby moving the position of the movable wall member 13 in the direction opposite to that of the arrow.

The movable wall member 13 operates, through the lever 11a connected to the connecting rod 13a, the connecting cylinder 11 or the injection timing control element of the injection timing control unit 8. In other words, the movement of the movable wall member 13 in the direction of the arrow advances the fuel injection timing, while its movement in the direction retards the fuel injection timing, thereby adjusting the fuel injection timing.

Next, an embodiment in which the present invention is applied to a fuel injection timing control system for a Diesel engine employing an in-line injection pump will be explained. FIG. 4 illustrates the predetermined fuel injection timing control characteristic of the engine used in this embodiment with the reference value of the engine rotational speed N on the abscissa and the degree $\theta$ of injection timing advance on the ordinate being taken as an origin.

This predetermined fuel injection timing control characteristic comprises two patterns P(1) and P(2). The pattern P(1) has a characteristic curve shown by the solid straight line connecting points A, B, C, D, E and F and the degree $\theta$ of advance increases linearly with increase in the engine rotational speed N over the speed range $N_3 \leq N \leq N_6$ as shown in FIG. 4. Thus, this is identical with the advance pattern of a previously known mechanical timer known as the automatic timer which employs the centrifugal force.

On the other hand, the other pattern P(2) is shown by the broken straight line connecting points A, G, H, C, D, I, J, E and F. The degree $\theta$ of advance increases linearly over the speed range $N_1 \leq N < N_3$, drops from the point H to the point C at $N = N_3$, increases along the portion CD of the curve over the range $N_3 < N < N_4$, increases from the point D up to the point I at $N = N_4$, increases linearly along the portion IJ over the range $N_4 < N < N_5$, reaches the maximum advance $\theta m$ at $N = N_5$, and thereafter stays along the portion J-E-F of the maximum advance $\theta m$ up to the maximum allowable rotational speed Nm of the engine.

Which of the advance patterns P(1) and P(2) is to be selected is determined by the amount of fuel injected. In the case of the in-line injection pump, the factor that determines the amount of fuel injected is the position of the fuel control rack (not shown) and therefore the position of this control rack is detected to indirectly detect the amount of fuel injected and thereby to select the proper advance pattern. In other words, it is designed so that if $X$ represents the position of the fuel control rack and $X_1$ represents a pattern changing position, then the advance pattern P(1) is selected over the range $0 \leq X < X_1$, while the advance pattern P(2) is selected for the position $X \geq X_1$.

Figure 6:
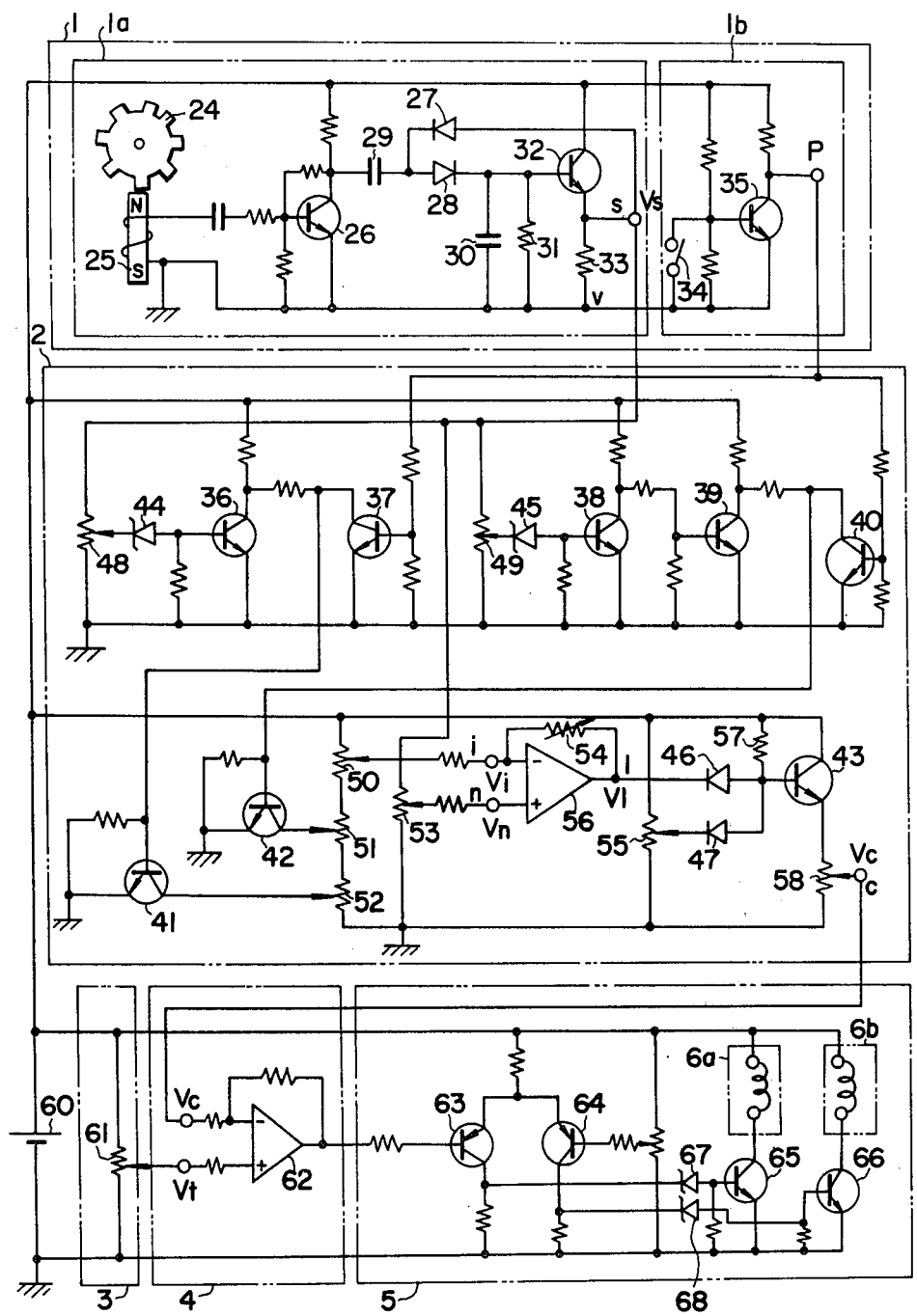
FIG. 6 is an electric wiring diagram showing an embodiment of the electric control circutry used with the present invention.

FIG. 6 illustrates an electric wiring diagram of the embodiment of the fuel injection timing control system of this invention designed to obtain the predetermined fuel injection timing control characteristic of FIG. 4 which comprises the above-described two patterns. In FIG. 6, numeral 1 designates the operating parameter detecting means comprising the speed signal generator 1a for generating a speed voltage proportional to the rotational speed of the engine and the injection quantity signal generator 1b for generating a signal corresponding to the position of the fuel control rack of the injection pump. The speed signal generator 1a comprises an inductor 24 operative in association with the rotation of the engine crankshaft and an electromagnetic pickup 25 consisting of a permanent magnet and a pickup coil and located opposite to the inductor 24, whereby a pulse voltage is generated whose frequency is proportional to the rotational speed of the engine. This pulse voltage is reshaped by a transistor 26 and it is then passed through a DC converter circuit comprising diodes 27 and 28, capacitors 29 and 30 and a resistor 31, thereby producing a speed voltage Vs across (between S and V) of an emitter resistor 33 of an amplifying emitter-follower transistor 32. The variation of this speed voltage Vs is shown in FIG. 5 in which the abscissa represents the engine rotational speed N and the ordinate represents the speed voltage Vs.

The injection quantity signal generator 1b comprises a limit switch 34 for effecting the required selection between the patterns at a predetermined position of the fuel control rack (not shown) of the injection pump, a limit switch actuating means operatively associated with the fuel control rack and a transistor 35 which determines the polarity of output signals. The limit switch 34 is arranged so that it remains closed over the range of the control rack position X from the starting point up to the changing position and it opens when the control rack position X goes beyond the changing position $X_1$.

Accordingly, the transistor 35 remains conconductive when the position of the control rack is within the range $0 \leq X < X_1$, while it is rendered conductive when $X \geq X_1$. In this way, the amount of fuel injected is indirectly detected to produce a pattern changing signal.

The control voltage generating circuit 2 generates a control voltage corresponding to the fuel injection timing control characteristic shown in FIG. 4. In the control voltage generating circuit 2, numerals 36, 37, 38, 39, 40, 41, 42 and 43 designate transistors, 44 and 45 Zener diodes, 46 and 47 diodes, 57 a resistor, 48, 49, 50, 51, 52, 53, 54, 55 and 58 potentiometers, 56 a differential amplifier-type operational amplifier, e.g., the Fairchild $\mu$ 709 operational amplifier whose characteristics and operation will not be described since they are known to those skilled in the art.

With the arrangement described above, the operation of this embodiment is as follows. When the position X of the injection pump fuel control rack (not shown) is within the range $0 \leq X \leq X_1$, the limit switch 34 of the injection quantity signal generator 1b is closed and the transistor 35 is thus rendered nonconductive. Consequently, the injection quantity signal at a point P constituting the collector of the transistor 35 becomes substantially equal to the voltage $V_B$ of a power supply 60, thereby rendering the transistors 37 and 40 conductive. In this way, the transistors 41 and 42 are always redered conconductive independently of the conduction or nonconduction of the transistors 36 and 39. As a result, a voltage Vi at an inverting terminal $i$ assumes the maximum value $Vi_1$ and the ramp waveform of an output voltage at an output terminal $l$ starts at the maximum value $Vs_2$ of the speed voltage Vs which determines the value of a noninverting input voltage Vn at a noninverting input point $n$.

The potentiometer 55 determines the maximum value of the control voltage and therefore a voltage corresponding to its voltage dividing ratio and the voltage at the output terminal $l$ of the operational amplifier 56 determine, through the diodes 46 and 47 constituting a lower limit selection circuit, a control voltage Vc at a voltage dividing point C of the emitter voltage divider 58 of the emitter follower transistor 43. In FIG. 7 showing the characteristic of this control voltage Vc, the abscissa represents the speed voltage Vs and the ordinate represents the control voltage Vc, and the control voltage shown by the straight line connecting points A', B', C', D', E and F' is generated with increase in the speed voltage. Accordingly, the control voltage that appears when a "low" injection quantity signal of the injection quantity signal generator 1b is on corresponds to the pattern P(1) of the predetermined fuel injection timing control characteristic shown in FIG. 4.

On the other hand, when the position X of the fuel control rack of the injection pump is within the range $X \geq X_1$ relative to the changing position $X_1$, the limit switch 34 of the injection quantity signal generator 1b is opened so that the transistor 35 becomes conductive and the transistors 37 and 40 become nonconductive.

Accordingly, the conduction and nonconduction of the trans stors 41 and 42, respectively, are determined in accordance with the collector output of the transistors 36 and 39, respectively. Further, the values of the potentiometers 48 and 49 and the Zener diodes 44 and 45 relative to the speed voltage Vs are determined so that the transistor 36 is rendered conductive when the speed voltage Vs becomes $Vs \geq Vs_3$, while the transistor 38 is rendered conductive when the speed voltage Vs becomes $Vs \geq Vs_4$.

Consequently, when the speed voltage Vs is within the range $0 \leq Vs < Vs_3$, the transistors 36 and 38 remain nonconductive and the transistor 39 becomes conductive. This causes the transistor 41 to become conductive and the transistor 42 to become nonconductive. As a result, in response to the potentiometer 52, the voltage Vi at the inverting input terminal i of the operational amplifier 56 assumes an intermediate value $Vi_2$ so that the ramp waveform of the output voltage at the output terminal l starts at the speed voltage $Vs = Vs_1$ and the control voltage Vc is determined along the straight line connecting the points A', G' and H'.

On the other hand, when the speed voltage Vs is within the range $Vs_3 \leq Vs < Vs_4$, the transistor 36 becomes conductive and the transistor 38 becomes nonconductive. This causes the transistor 41 to become nonconductive. Further, since the transistor 39 becomes conductive and the transistor 42 becomes nonconductive, the voltage Vi at the inverting input terminal i of the operational amplifier 56 becomes $Vi = Vi_1$ assuming the maximum value. consequently, the control voltage is determined along the straight line C' D'.

Further, when the speed voltage Vs is within the range $Vs \geq Vs_4$, the transistor 38 becomes conductive causing the transistor 39 to become nonconductive and the transistor 42 to become conductive. Consequently, the voltage Vi at the inverting input terminal i of the operational amplifier 56 assumes the minimum value $Vi_3$ and therefore the control voltage assumes the values along the straight line joining the points D', I', J', E' and F'. As a result, the control voltage characteristic obtainable when a "high" injection quantity signal of the injection quantity signal generator 1b is on, corresponds to the pattern P(2) of the predeterminted fuel injection timing control characteristic shown in FIG. 4.

In the injection timing voltage generator 3, a potentiometer 61 operatively associated with the position of the lever 11a of the connecting cylinder 11 or the injection timing control element of the injection timing control unit 8, generates an injection timing voltage Vt corresponding to the injection timing. In FIG. 8 showing the characteristic of this injection timing voltage Vt, the abscissa represents the injection timing advance 0 and the ordinate represents the injection timing voltage Vt.

The comparator 4 comprises a differential type operational amplifier 62 of the same type as the operational amplifier 56, and the control voltage Vc is applied as its inverting input and the injection timing voltage Vt is applied as its noninverting input. The output of the operational amplifier 62 is such that with the reference value of about one half the power supply voltage $V_B$, the resultant deviation signal is 0 when $Vt = Vc$ and hence the input deviation is zero. On the other hand, when there is a condition $Vt > Vc$ or $Vt < Vc$, a signal corresponding to the positive or negative deviation is generated.

The valve driving circuit 5 comprises four transistors 63, 64, 65 and 66, Zener diodes 67 and 68 and electromagnetic control valves 6a and 6b, and the transistors 63 and 64 constitute a differential amplifier of a known type. It is further arranged so that when the deviation signal produced at the output of the comparator 4 is 0, the voltage between the ground and the collector of the transistors 63 and 64, respectively, is lower than the breakdown voltage of the Zener diodes 67 and 68, respectively, thereby causing the transistors 65 and 66 to become nonconductive. Consequently, there is no exciting currrent flowing in the exciting coil of the electromagnetic control voltage 6a and 6b, respectively, and thus the control valves 6a and 6b are in the closed position.

On the other hand, when the deviation signal exceeds a positive predetermined limit, the voltage between the ground and the collector of the transistor 63 decreases with the result that the voltage between the ground and the collector of the transistor 64 increases to conduct the Zener diode 68 alone. Consequently, while the transistor 65 remains nonconductive, the transistor 66 is rendered conductive energizing the electromagnetic control valve 6b. As a result, the electromagnetic control valve 6b opens and the electromagnetic control valve 6a remains in the closed position.

When the deviation signal exceeds a negative predetermined limit, the voltage between the ground and the collector of the transistor 63 increases with resultant decrease in the voltage between the ground and the collector of the transistor 64, causing the Zener diode 67 to to conduct alone. Consequently, the transistor 65 becomes conductive to energize the electromagnetic control valve 6a and thus the control valve 6a is opened. On the other hand, the transistor 66 remains nonconductive and hence the electromagnetic control valve 6b remains in the closed position.

With the arrangement described so far, the operation of the system of this invention will be described. When the position X of the injection pump fuel control rack is within the range $X < X_1$ with respect to the changing position $X_1$ so that the injection quantity signal generator 1b generates a "low" injection quantity signal, the control voltage Vc of the control voltage generator 2 corresponding to the speed voltage Vs of the speed signal generator 1a is determined in accordance with the pattern shown by the straight line joining the points A', B', C', D', E' and F' in FIG. 7 and the comparator 4 detects the deviation of the injection timing voltage Vt with respect to the control voltage Vc. The electromagnetic control valves 6a and 6b are selectively actuated in accordance with the deviation signal and thus the fluid actuator 7 is operated to move the position of the connecting cylinder 11 or the injection timing control element of the injection timing control unit 8. Consequently, the injection timing is automatically controlled with the pattern P(1) of the predetermined fuel injection timing control characteristic of FIG. 4 representing the desired value.

On the other hand, when the position X of the control rack is within the range $X \geq X_1$ with respect to the changing position $X_1$ so that the injection quantity signal generator 1b generate a "high" injection quantity signal, the control voltage Vc of the control voltage generator 2 corresponding to the speed voltage Vs is determined in accordance with the pattern shown by the straight line joining the points A', G', H', C', D', I', J', E' and F' and the comparator 4 compares the resultant control voltage Vc with the injection timing voltage Vt. Consequently, when there is a detected deviation signal, the valve driving circuit 5 actuates the corresponding electromagnetic control valve with the result that the fluid actuator 7 moves the position of the injection timing control element and thus the injection timing is automatically controlled in accordance with the desired value represented by the pattern P(2) of the predetermined fuel injection timing control characteristic shown in FIG. 4.

While, in the embodiment of this invention so far described, the operating parameter detecting means detects the engine rotational speed and fuel injection quantity, other operating parameters such as the temperature of engine cooling water and exhaust gas compositions may be additionally detected to reflect these factors in the injection timing, thereby more accurately grasp the operating conditions of an engine and thus ensuring more satisfactory results.

Further, while the injection pump comprises an in-line injection pump, the present invention may be equally applied to other types of injection pump. For example, a distributor-type injection pump usually contains a hydraulic timer as an injection timing control unit and the timer piston performs the same function as the movable wall member of the fluid actuator. Therefore, it is possible to provide a construction equivalent to that of the present invention by using, in combination with this timer piston, the required electromagnetic control valves, operating parameter detecting means, control voltage generator, timer piston position detector, comparator and valve driving circuit.

We claim:
1. A fuel injection timing control system for an internal combustion engine comprising:
a fuel injection timing control element provided in an injection pump; operating parameter detecting means for detecting the operating parameters of an engine in the form of electric signals, said detecting means including at least a speed signal generator for detecting the rotational speed of the engine and a fuel injection quantity signal generator for detecting the position of a fuel control rack of an injection pump; a control voltage generator for receiving the signals generated by said operating parameter detecting means and for generating a control voltage corresponding to a predetermined fuel injection timing control characteristic of the engine; an injection timing voltage generator for generating a voltage corresponding to the injection timing of said injection pump; a comparator for comparing said control voltage and said injection timing voltage to generate a deviation signal corresponding to the difference therebetween; and a driving circuit responsive to said deviation signal to actuate said fuel injection timing control element wherein when said fuel control rack of said injection pump reaches a predetermined position, a signal is generated by said fuel injection quantity signal generator for changing the control voltage of said control voltage generator from a control voltage corresponding to a first predetermined fuel injection timing control characteristic to a control voltage corresponding to a second predetermined fuel injection timing control characteristic of said engine.

2. A fuel injection timing control system according to claim 1 further including a fluid actuator provided with a fluid chamber containing a movable wall member therein, and electromagnetic control valve means, wherein said movable wall member is operatively connected to said fuel injection timing control element, and said driving ciruit controls said electromagnetic control valve means.

3. A fuel injection timing control system for an internal combustion engine comprising:
a fuel injection timing control element provided in an injection pump;
operating parameter detecting means for detecting two operating parameters of an engine, said detecting means including at least a speed signal generator for generating a voltage proportional to the rotational speed of said engine and an injection quantity signal generator for generating a voltage having predetermined levels which vary when the position of a fuel control rack of said injection pump reaches a predetermined position;
a control voltage generator connected to said detecting means for generating a control voltage corresponding to predetermined injection timing characteristics which are varied with said predetermined voltage levels; and
driving means connecting between said control voltage generator and said fuel injection control element for controlling said control element in response to said control voltage.
said fuel injection timing control element includes means mounted between a crank shaft of the engine and a driving shaft of the injection pump to connect the crank shaft with the driving shaft for varying the phase angle of connection of the crank shaft with the driving shaft in accordance with the control voltage, and wherein said driving means includes feed back means for controlling the position of said element to a position directed by the control voltage.

* * * * *

UNITED STATES PATENT OFFICE
CERTIFICATE OF CORRECTION

Patent No. 4,019,478          Dated    April 26, 1977

Inventor(s) Nobuhito HOBO, Nizo ENOMOTO, Yutaka SUZUKI, et al

It is certified that error appears in the above-identified patent and that said Letters Patent are hereby corrected as shown below:

In the heading

Please add:

-- [30] Foreign Application Priority Data

July 25, 1972   Japan.....74268/72--

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*